US006359043B1

(12) United States Patent
Gijzen

(10) Patent No.: US 6,359,043 B1
(45) Date of Patent: *Mar. 19, 2002

(54) MICA AS FLAME RETARDANT IN GLASS FILLED NORYL

(75) Inventor: Erwin Marie Alfred Gijzen, Poortvliet (NL)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,577

(22) Filed: Sep. 24, 1998

(51) Int. Cl.[7] .............................. C08K 5/52; C08L 71/12
(52) U.S. Cl. ........................ 524/147; 524/141; 524/145; 524/127; 524/449
(58) Field of Search ................................ 524/147, 141, 524/145, 127, 449

(56) References Cited

U.S. PATENT DOCUMENTS

| | | | |
|---|---|---|---|
| 3,169,925 A | * 2/1965 | Mahoney ..................... | 558/162 |
| 3,360,591 A | * 12/1967 | Giammara et al. ......... | 558/162 |
| 3,383,435 A | 5/1968 | Cizek | |
| 3,883,613 A | 5/1975 | Cooper ....................... | 260/874 |
| 4,097,550 A | 6/1978 | Haaf et al. | |
| 4,101,503 A | 7/1978 | Cooper et al. | |
| 4,101,504 A | 7/1978 | Cooper et al. | |
| 4,101,505 A | 7/1978 | Cooper et al. | |
| 4,113,800 A | 9/1978 | Lee, Jr. | |
| 4,128,602 A | 12/1978 | Katchman et al. | |
| 4,139,574 A | 2/1979 | Cooper et al. | |
| 4,154,712 A | 5/1979 | Lee, Jr. | |
| 4,191,685 A | 3/1980 | Haaf et al. ................ | 260/45.95 |
| 4,212,832 A | * 7/1980 | Mitschke et al. ........... | 558/162 |
| 4,246,169 A | * 1/1981 | Norris et al. ................ | 558/162 |
| 4,463,130 A | 7/1984 | Serini et al. ................... | 525/67 |
| 4,483,958 A | 11/1984 | Kosaka et al. | |
| 4,520,152 A | 5/1985 | Axelrod ....................... | 542/120 |
| 4,692,488 A | 9/1987 | Kress et al. ................. | 542/139 |
| 4,740,554 A | 4/1988 | Kress et al. .................... | 525/67 |
| 4,766,165 A | 8/1988 | Kress et al. ................. | 524/140 |
| 4,837,276 A | * 6/1989 | Fuhr et al. ................... | 524/127 |
| 4,879,330 A | 11/1989 | De Munck ................... | 524/151 |
| 4,927,870 A | 5/1990 | Ogoe et al. .................. | 524/140 |
| 5,061,745 A | 10/1991 | Wittmann et al. ........... | 524/139 |
| 5,071,894 A | * 12/1991 | Weil et al. .................... | 524/127 |
| 5,084,496 A | * 1/1992 | Ishida et al. ................. | 524/127 |
| 5,278,212 A | * 1/1994 | Nishihara et al. ............ | 558/162 |
| 5,294,654 A | * 3/1994 | Hellstern-Burnell et al. ..... | 524/127 |

FOREIGN PATENT DOCUMENTS

| | | |
|---|---|---|
| EP | 0 491 986 A1 | 1/1992 |
| EP | 491986 * | 7/1992 |
| EP | 0 528 113 A1 | 2/1993 |
| EP | 528113 * | 2/1993 |
| EP | 0712 902 A1 | 5/1996 |
| EP | 0 732 368 A2 | 9/1996 |
| GB | 2 076 830 | 12/1981 |
| JP | 59-24736 | 2/1984 |
| JP | 59-45351 | 3/1984 |
| JP | 59-202240 | 11/1984 |
| JP | 63-5161 * | 12/1988 |
| JP | 2-187456 * | 7/1990 |
| JP | 4-279660 * | 10/1992 |
| JP | 9-291208 | 11/1997 |
| JP | 9-291209 | 11/1997 |
| WO | WO 90/14386 | 12/1990 |
| WO | WO 93/04119 | 3/1993 |

OTHER PUBLICATIONS

Japanese Patent Abstract 59202240 A, dated Nov. 16, 1984, by Inventor:. T. Yoshinori et al.
Japanese Patent Abstract 02187456 A, dated Jul. 23, 1990, by Inventor: M. Masataka et al.
Japanese Patent Abstract 04279660 A, dated Oct. 5, 1992, by Inventor: H. Mitsuhiro.

* cited by examiner

Primary Examiner—James J. Seidleck
Assistant Examiner—Olga Asinovsky
(74) Attorney, Agent, or Firm—Cantor Colburn LLP

(57) ABSTRACT

The present invention is related to compositions that comprise polyphenylene ether resin, polystyrene resin, glass fibers, an organophosphate compound and an amount of mica effective to render the composition V-0 when measured at a thickness of 1.6 mm. In preferred embodiments of the invention, the amount of mica ranges from about 1% by weight to less than 5% by weight, based upon the weight of the entire composition.

12 Claims, No Drawings

MICA AS FLAME RETARDANT IN GLASS FILLED NORYL

CROSS-REFERENCE TO RELATED APPLICATIONS

Not Applicable

FEDERALLY SPONSORED RESEARCH

Not Applicable

BACKGROUND OF THE INVENTION

1. Field of the Invention

The invention relates to glass fiber reinforced poly (phenylene ether) resin compositions, and more particularly relates to flame resistant, glass fiber reinforced poly (phenylene ether) resin compositions.

2. Brief Description of the Related Art

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Moreover, the combination of PPE and high impact polystyrene resins with glass fiber reinforcement results in additional overall properties such as increased stiffness. Examples of such blends can be found in U.S. Pat. Nos. 3,383,435; 4,097,550; 4,113,800; 4,101,503, 4,101,504; 4,101,505; 4,128,602; 4,139,574; and 4,154,712 among others.

The properties of these blends can be further enhanced by the addition of various additives such as flame retardants, light stabilizers, processing stabilizers, heat stabilizers, antioxidants, and other fillers. Many applications such as internal frames and parts for computer printers and facsimile machines require a combination of high stiffness, outstanding dimensional stability over a wide temperature range, and a flame resistance rating of V-0 under the Underwriter's Laboratory UL94 protocol at the wall thickness corresponding to the approximate wall thickness of the application article. As the internal frames and parts have increased in functionality and decreased in wall thickness, achieving a V-0 rating has become increasingly difficult. Presently, resin materials need to be rated V-0 under the UL94 protocol when measured at a 1.6 mm wall thickness.

It is therefore apparent that there continues to be a need for improved compositions as well as processes to manufacture compositions containing polyphenylene ether resins that are rated V-0 under the UL94 protocol when measured at a 1.6 mm wall thickness.

SUMMARY OF THE INVENTION

The present invention involves thermoplastic compositions comprising (a) a polyphenylene ether resin; (b) at least one polystyrene resin; (c) about 5% by weight to about 20% by weight of an organophosphate compound; (d) about 5% by weight to about 40% by weight of glass fibers; and (e) an amount of mica effective to render the composition V-0 when measured at a thickness of 1.6 mm; wherein all weights are based on the weight of the entire composition.

DESCRIPTION OF THE DRAWINGS

Not applicable

DETAILED DESCRIPTION OF THE INVENTION

As previously discussed, the compositions of the present invention comprise polyphenylene ether resin, polystyrene resin, glass fibers, an organophosphate compound and an amount of mica effective to render the composition V-0 when measured at a thickness of 1.6 mm.

PPE, per se, are known polymers comprising a plurality of structural units of the formula:

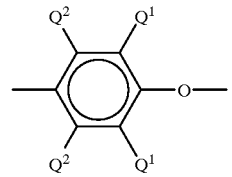

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

It will be apparent to those skilled in the art from the foregoing that the PPE contemplated for use in the present invention include all those presently known, irrespective of variations in structural units or ancillary chemical features.

The PPE generally have an intrinsic viscosity often between about 0.10–0.60 dl./g., preferably in the range of about 0.30–048 dl./g., all as measured in chloroform at 25° C. It is also possible to utilize a higher intrinsic viscosity PPE and a lower intrinsic viscosity PPE in combination. Determining an exact ratio, when two intrinsic viscosities are used, will depend somewhat on the exact intrinsic viscosities of the PPE used and the ultimate physical properties that are desired.

The PPE compositions of the present invention preferably contain at least one nonelastomeric polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula:

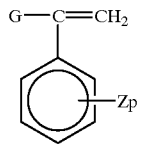

wherein G is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, i.e. polystyrene resin, is an amount effective to improve the flow and processability of the composition. Improved flow can be indicated by reduced viscosity or reduced injection pressures needed to fill a part during an injection molding process. Generally, the nonelastomeric alkenylaromatic compound is utilized in the range of about 2% to about 40% by weight based on the total weight of the composition. The preferred range is about 4% to about 30% by weight; based on the total weight of the composition.

The compositions of the present invention also comprise at least one flame retardant, generally an organic phosphate. The organic phosphate is preferably an aromatic phosphate compound of the formula:

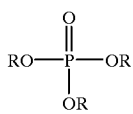

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenylbisneopentyl phosphate, phenyl-bis (3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis(2, 5,5'-trimethylhexyl) phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula

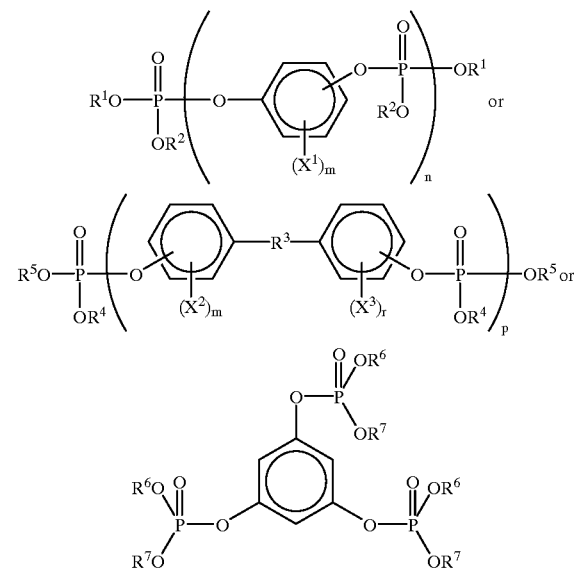

including mixtures thereof, in which $R^1$, $R^2$, $R^3$, $R^4$, $R^5$, $R^6$ and $R^7$ are, independently, hydrocarbon of from $C_{1-20}$, aryl, or alkyl-substituted aryl; $X^1$, $X^2$ and $X^3$ are halogen; m and r are 0 or integers from 1 to 4, and n and p are from 1 to 30. When m and/or r are 0, the aromatic rings contain hydrogens without halogen substitution.

Examples include the (tetraphenyl)bisphosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another development is the use of certain cyclic phosphates, for example, diphenyl pentaerythritol diphosphate, as a flame retardant agent for polyphenylene ether resins, as is described by Axelrod in U.S. Pat. No. 4,254,775.

Also suitable as flame-retardant additives for this invention are compounds containing phosphorus -nitrogen bonds, such as phosphonitrilic chloride, phosphorus ester amides, phosphoric acid amides, phosphonic acid amides, phosphinic acid amides, tris(aziridinyl) phosphine oxide, or tetrakis(hydroxymethyl) phosphonium chloride. These flame-retardant additives are commercially available.

Preferred phosphate flame retardants include those based upon resorcinol such as, for example, resorcinol tetraphenyl diphosphate, as well as those based upon bis-phenols such as, for example, bis-phenol A tetraphenyl diphosphate. Phosphates containing substituted phenyl groups are also preferred. In an especially preferred embodiment, the organophosphate is selected from the group consisting of resorcinol tetraphenyl diphosphate, bis-phenol A tetraphenyl diphosphate, and mixtures containing at least one of the foregoing.

The flame retardant is preferably present between about 5% by weight and 20% by weight, based on the weight of the entire composition. The particular amount will vary, depending on the molecular weight of the organic phosphate, the amount of the flammable resin present and possibly other normally flammable ingredients which might also be included in the composition.

As mentioned above, the present invention contains glass fibers, which greatly increase flexural strength and modulus, as well as increasing tensile strength. In general, limealuminum borosilicate glass that is relatively soda-free ("E" glass) is preferred.

Although glass roving may be used, cut fibers are preferred. The length of such fibers is usually at least about 3 mm; and a preferred length is in the range of about 3 mm to about 13 mm. (These lengths are based on the material before incorporation into the composition). A preferred diameter for the fibers is in the range of about 0.002 mm to about 0.02 mm. General descriptions of glass fibers can be found in U.S. Pat. No. 4,226,761.

A preferred amount of glass fiber for the present invention is in the range of about 5% by weight to about 40% by weight, based on the weight of the entire composition. Larger amounts within this range are usually employed when the end use of the composition requires a higher degree of stiffness and strength. In some preferred embodiments, the amount of glass fiber present is in the range of about 10% by weight to about 30% by weight, based upon the weight of the entire composition.

As mentioned above, the present invention requires an effective amount of mica (component (e)) to enhance the flame resistance characteristics of the composition. The use of component (e) is critical when a V-0 flame rating is required in thin wall sections (i.e. 1.6 mm). In other words, the composition of the present invention contains an amount of mica effective to render the composition V-0 when tested at a thickness of 1.6 mm. Effective amounts will of course differ according to the exact amounts of the other components present, but they are generally in the range of about 1% by weight to about 25% by weight, preferably in the range of about 1% by weight to less than 5% by weight, more preferably in the range of about 1% by weight to about 4% by weight, based on the weight of the entire composition.

Various forms of mica are suitable, and many are described in the literature and various U.S. patents, such as U.S. Pat. Nos. 4,283,326 and 4,560,715. Examples of the various forms are muscovite, phlogopite, biotite, fluorophlogopite, and synthetic mica, with phlogopite being the most preferred. Furthermore, the mica is preferably in the form of flakes having an aspect ratio of about 40–120 (length/thickness). Such mica is commercially available, for example, from Suzorite Mica Products, Inc. as grade 200-HK.

The compositions of the present invention may also contain at least one impact modifier. The impact modifier may be used alone or in combination with a nonelastomeric alkenylaromatic compound. The impact modifiers include block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are available commercially from a number of sources, including Phillips Petroleum under the trademark SOLPRENE, Shell Chemical Co. under the trademark KRATON, and Kuraray under the trademark SEFTON.

Various mixtures of the aforementioned impact modifiers are also sometimes useful. The amount of the impact modifier generally present, when one is used, is an amount effective to improve the physical properties, for example, the ductility of the composition when compared to the same composition without an impact modifier. Improved ductility can be indicated by increased impact strength, increased tensile elongation to break, or both increased impact strength and increased tensile elongation to break. Generally, the impact modifier is utilized in the range of about 1% to about 20% by weight based on the total weight of the composition. A preferred range is about 1% to about 8% by weight; based on the total weight of the composition. The exact amount and types or combinations of impact modifiers utilized will depend in part on the requirements needed in the final blend composition.

Preferred compositions have the major components which make up the composition in an amount within the following preferred ranges:
Polyphenylene ether resin, (a) about 50 to about 70 parts;
Non-elastomeric polymer of an alkenylaromatic compound, (b) about 2 to about 20 parts;
Organic phosphate, (c) about 5 to about 20 parts;
Glass fibers, (d) about 10 to about 35 parts; and
Mica, (e) about 1 to less than 5 parts based upon 100 parts by weight of (a), (b), (c), (d), and (e) together.

Various other additives may be present in effective amounts in the presently-described composition, such as drip retardants, impact modifiers, dyes, pigments, colorants, lubricants, heat stabilizers, ultraviolet light stabilizers, and plasticizers. The effective levels can be readily determined without undue experimentation, but usually range, for each additive, from about 0.1% by weight to about 35% by weight, based on the weight of the entire composition.

The preparation of the compositions of the present invention is normally achieved by blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition. The compositions of the present invention are useful for making molded articles such as internal frames and parts for computer printers and facsimile machines, and are useful for making various other molded articles.

All patents cited herein are hereby incorporated by reference.

EXAMPLES

The following illustrative examples demonstrate various embodiments of the present invention. However, they are not intended to limit the invention in any manner.

The ingredients utilized in the examples are as follows:
PPE polyphenylene oxide resin
HIPS high impact polystyrene resin
RDP resorcinol tetraphenyl diphosphate
Glass chopped glass fiber
Mica Suzorite mica, grade 200-HK
Adds: a combination of additives containing a weight ratio of 1.5 polyethylene to 0.3 tridecylphosphite to 0.1 zinc oxide to 0.1 zinc sulfide The compositions of the table were extruded on a Werner-Pfleiderer twin-screw extruder at a temperature of about 290° C. with a vacuum of 1 inch Hg applied to the melt during compounding. The resultant compositions were molded using a Stork injection molding machine using a temperature set of about 280° C. and a mold temperature of about 80° C. All the compositions were subjected to flammability testing in accordance with Underwriters Laboratory Bulletin 94 Procedures (UL94) utilizing a test sample thickness of 1.6 mm. Specifically, the average flame out time and the maximum flame out times were measured and UL94 rating was assigned.

| Sample # | 1 | 2 | 3 | 4 | 5 | 6 | 7 |
|---|---|---|---|---|---|---|---|
| PPE | 60.7 | 57 | 57 | 57 | 57 | 53.3 | 53.3 |
| HIPS | 5.3 | 5 | 5. | 5 | 5 | 4.7 | 4.7 |
| RDP | 17 | 16 | 16 | 16 | 16 | 15 | 15 |
| Glass | 15 | 20 | 19 | 18 | 15 | 25 | 23 |
| Mica | o | o | i | 2 | 5 | 0 | 2 |
| Adds | 2 | 2 | 2 | 2 | 2 | 2 | 2 |
| Properties | | | | | | | |
| Flame out time | 4.5 | 4.1 | 3.6 | 4.1 | 2.6 | 4.4 | 3.4 |
| Classification | V-1 | V-1 | V-0 | V-0 | V-0 | V-1 | V-0 |

As seen by the illustrative data, samples 1 and 2 do not contain mica and are classified V-1 in the Underwriters Laboratory burn test. Sample 3 contains only 1% by weight mica yet unexpectedly has an improved burn classification to V-0. Likewise, a comparison of sample 6 with sample 7 also demonstrates an amount of mica effective to render the composition V-0.

It should be noted that samples 2 to 5 contain the same amount of combustible material, i.e. same amount of resin, and that in sample 3 to 5, the glass fiber has been replaced by mica. A replacement of a substantial amount of the combustible resin with an incombustible material, e.g., mica, may logically be expected to reduce the flame out time and improve the flame rating from the mere fact of having less resin present to burn. However, replacement of the glass fiber, an incombustible material, with another incombustible material, the mica, with a constant combustible resin level would not have been expected to reduce the flame out time and the flame rating of the composition. Consequently, the reduced flame out time and improved flame rating to V-0 found for samples 3 to 5 in comparison to sample 2 is completely unexpected.

It should be clear that the present invention encompasses a method to afford a resin composition that is rated V-0 when measured at a thickness of 1.6 mm and the resin composition made by the method.

What is claimed:

1. A resin composition comprising:
   a) at least one polyphenylene ether resin;
   b) at least one polystyrene resin;
   c) about 5% by weight to about 20% by weight, based on the weight of the entire composition, of an organophosphate compound;
   d) about 5% by weight to about 40% by weight, based on the weight of the entire composition, of glass fibers; and
   e) about 1% by weight to about 2% by weight, based on the weight of the entire composition, of mica;
wherein the composition has a UL94 rating of V-0 when measured at a thickness of 1.6 millimeters.

2. The composition of claim 1 wherein the composition comprises:
   a) about 50 to about 70 parts by weight of the at least one polyphenylene ether resin;
   b) about 2 to about 20 parts by weight of the at least one polystyrene resin.

3. The composition of claim 1 wherein the composition further comprises at least one impact modifier.

4. A resin composition consisting essentially of:
   a) a polyphenylene ether resin;
   b) at least one polystyrene resin;
   c) about 5% by weight to about 20% by weight, based on the weight of the entire composition, of an organophosphate compound;
   d) about 5% by weight to about 40% by weight, based on the weight of the entire composition, of glass fibers; and
   e) an amount of mica, based on the weight of the entire composition, wherein the composition has a UL94 rating of V-0 when measured at a thickness of 1.6 mm.

5. A method to afford a resin composition that is rated V-0 when measured at a thickness of 1.6 mm, wherein said method comprises melt mixing:
   a) at least one polyphenylene ether resin;
   b) at least one polystyrene resin;
   c) about 5% by weight to about 20% by weight of an organophosphate compound;
   d) about 5% by weight to about 40% by weight of glass fibers; and
   e) about 1% by weight to about 2% by weight of mica;
wherein all weights are based on the weight of the entire composition.

6. The method of claim 5 wherein the at least one polyphenylene ether resin is present at about 50 to about 70 parts by weight, and the at least one polystyrene resin is present at about 2 to about 20 parts by weight, based on the weight of the entire composition.

7. The method of claim 5 wherein the organophosphate compound is selected from the group consisting of resorcinol tetraphenyl diphosphate, bis-phenol A tetraphenyl diphosphate, and mixtures containing at least one of the foregoing.

8. A resin composition, comprising the reaction product of:
   a) at least one polyphenylene ether resin;
   b) at least one polystyrene resin;
   c) about 5% by weight to about 20% by weight, based on the weight of the entire composition, of an organophosphate resin;
   d) about 5% by weight to about 40% by weight, based on the weight of the entire composition, of glass fibers; and
   e) about 1% by weight to about 2% by weight, based on the weight of the entire composition, of mica.

9. The resin composition of claim 4 wherein the at least one polyphenylene ether is present at about 50 to about 70 parts by weight, and wherein the at least one polystyrene resin is present at about 2 to about 20 parts by weight.

10. The resin composition of claim 4 wherein the amount of mica is about 1% by weight to about 2% by weight, based on the weight of the entire composition.

11. A resin composition consisting essentially of the composition obtained by blending:
   a) a polyphenylene ether resin;
   b) at least one polystyrene resin;
   c) about 5% by weight to about 20% by weight of an organophosphate compound;
   d) about 5% by weight to about 40% by weight glass fibers; and
   e) about 1% by weight to about 4% by weight of mica, wherein the composition has a UL94 rating of V-0 when measured at a thickness of 1.6 mm; and
wherein all weight percentages are based on the weight of the entire composition.

12. A method to afford a resin composition having a UL94 rating of V-0 when measured at a thickness of 1.6 mm, wherein said method comprises:

melt mixing a composition consisting essentially of
- a) at least one polyphenylene ether resin;
- b) at least one polystyrene resin;
- c) about 5% by weight to about 20% by weight of an organophosphate compound;
- d) about 5% by weight to about 40% by weight of glass fibers; and
- e) about 1% by weight to about 4% by weight of mica, wherein the composition has a UL94 rating of V-0 when measured at a thickness of 1.6 mm; and wherein all weight percentages are based on the weight of the entire composition.

* * * * *

UNITED STATES PATENT AND TRADEMARK OFFICE
CERTIFICATE OF CORRECTION

| | | |
|---|---|---|
| PATENT NO. | : 6,359,043 B1 | Page 1 of 1 |
| DATED | : March 19, 2002 | |
| INVENTOR(S) | : Erwin Marie Alfred Gijzen | |

It is certified that error appears in the above-identified patent and that said Letters Patent is hereby corrected as shown below:

<u>Column 8,</u>
Line 8, replace "an amount" with -- about 1% by weight to about 4% by weight --

Signed and Sealed this

Nineteenth Day of August, 2003

JAMES E. ROGAN
*Director of the United States Patent and Trademark Office*